(12) United States Patent
Bowman et al.

(10) Patent No.: US 9,627,871 B2
(45) Date of Patent: Apr. 18, 2017

(54) FIRE CLASSIFIED FLOOR BOX ASSEMBLY

(75) Inventors: Timothy S. Bowman, Canton, CT
(US); Michael Guerrette, Terryville,
CT (US); Nathan Hoffman, Ellington,
CT (US); Craig Jones, Brooklyn, CT
(US)

(73) Assignee: The Wiremold Company, West
Hartford, CT (US)

( * ) Notice: Subject to any disclaimer, the term of this
patent is extended or adjusted under 35
U.S.C. 154(b) by 1476 days.

(21) Appl. No.: 12/552,396

(22) Filed: Sep. 2, 2009

(65) Prior Publication Data

US 2010/0051615 A1    Mar. 4, 2010

Related U.S. Application Data

(60) Provisional application No. 61/094,206, filed on Sep. 4, 2008.

(51) Int. Cl.
*H02G 3/08*    (2006.01)
*H02G 3/18*    (2006.01)

(52) U.S. Cl.
CPC ................................. *H02G 3/185* (2013.01)

(58) Field of Classification Search
USPC .................................................... 220/3.3, 3.8
See application file for complete search history.

(56) References Cited

U.S. PATENT DOCUMENTS

| | | | |
|---|---|---|---|
| 4,099,020 A | 7/1978 | Kohaut | |
| 4,232,493 A | 11/1980 | Gray et al. | |
| 4,264,779 A | 4/1981 | Rhodes et al. | |
| 4,364,210 A | 12/1982 | Fleming et al. | |
| 5,121,594 A | 6/1992 | Wuertz | |
| 5,285,009 A * | 2/1994 | Bowman et al. | 174/482 |
| 5,467,565 A * | 11/1995 | Bowman et al. | 52/220.1 |
| 5,907,936 A * | 6/1999 | Littrell | 52/220.5 |
| 5,913,788 A * | 6/1999 | Herren | 52/241 |
| 5,916,788 A * | 6/1999 | Kubota et al. | 435/173.4 |

FOREIGN PATENT DOCUMENTS

DE    37 07 254 A1    9/1988
EP    1 847 748 A2    10/2007

OTHER PUBLICATIONS

European Search Report for Application EP 09 16 9217 dated Mar. 31, 2015.

* cited by examiner

*Primary Examiner* — Jeffrey Allen
*Assistant Examiner* — Kevin Castillo
(74) *Attorney, Agent, or Firm* — McCormick, Paulding & Huber LLP

(57) ABSTRACT

A floor box assembly includes a floor box, a mounting plate, a below-floor insulation kit, and an intumescent stem. When the floor box is installed on a floor deck having flutes and valleys, the mounting plate straddles one or more valleys and supports the floor box. The below-floor insulation kit closes off the flutes adjacent to the valley straddled by the mounting plate, and the intumescent stem penetrates the floor deck at the bottom of the valley. When installed, the floor box assembly is held together by attachment fasteners extending from the mounting plate through the floor deck and the below-floor insulation kit.

19 Claims, 7 Drawing Sheets

FIRE CLASSIFIED FLOOR BOX ASSEMBLY

CROSS REFERENCE TO RELATED APPLICATIONS

The present application claims priority to U.S. Provisional Patent Application Ser. No. 61/094,206, filed Sep. 4, 2008, hereby incorporated herein by reference in its entirety.

FIELD OF THE INVENTION

The present invention relates to electrical assemblies for through-floor installation and, more particularly, to floor box assemblies for installation in concrete floors.

BACKGROUND OF THE INVENTION

Multi-story buildings include at least one floor located above another. A fire that starts on a lower floor will transfer heat to the floor above. With proper design, the floor construction will allow adequate time for people on the upper floor to vacate the building. The inherent thermal characteristics of concrete are considered during the design phase. At a given thickness, concrete will retard the transfer of heat for a set time. A reduction of the thickness of the concrete will potentially compromise the floor design and reduce the time occupants have to escape from a fire. Likewise, any opening or through-penetration of the floor will permit the heat and/or fire to travel between the floors.

Buildings often require a reduction of concrete thickness or penetration through the floor for functional purposes. Common examples include plumbing fixtures, HVAC ductwork, and electrical conduits and outlet boxes. Products such as electrical outlet boxes, when embedded in a concrete floor, reduce the floor's insulation capacity. A common method for restoring insulation capacity is to apply a sprayed insulation under the floor directly below the outlet box. Another method to insulate the outlet box is to construct a wallboard enclosure that is secured below the floor directly below the outlet box. These common methods for increasing insulation capacity have positive effect only when the below-floor insulation is properly aligned with the above-floor outlet box.

Additionally, an electrical conduit must be attached to the outlet box for distribution of electrical services. Typically, the conduit is routed through the concrete between the outlet box and a nearby utility distribution room. Through-deck routing further compromises the thermal performance of the floor, since the embedded conduit displaces the concrete. Alternatively, the conduit is routed from the outlet box directly below the floor. The below-floor routing does not directly compromise the thermal performance of the floor. However, the below-floor conduit provides a passageway from below the floor into the outlet box. Without sealing this passageway, heat and flame generated by a fire below the outlet box can travel through the conduit, accelerating the transfer of heat to the outlet box.

Therefore, there is a need to provide an improved fire classified floor box assembly.

SUMMARY OF THE INVENTION

According to an embodiment of the present invention, a floor box assembly for installation with a floor deck having alternating flutes and valleys includes a floor box disposed on an upper surface of the floor deck and an insulation kit for providing insulation for the floor box assembly wherein the insulation kit is disposed below the floor box on an underside of the floor deck. The floor box assembly may also include an intumescent stem enclosing a central passage for through-floor routing of wires to the floor box. The insulation kit includes a tray and at least one flute closure disposed between the tray and an underside of the floor deck to provide insulation to the floor box. The insulation kit may also include an insulation board disposed between the tray and the at least one flute closure as well as an insulative spacer to allow for variations in the floor depth.

The present invention accomplishes these characteristics through a combination of structures, as further described with reference to the drawings.

DETAILED DESCRIPTION OF A PREFERRED EMBODIMENT

Figure 1:
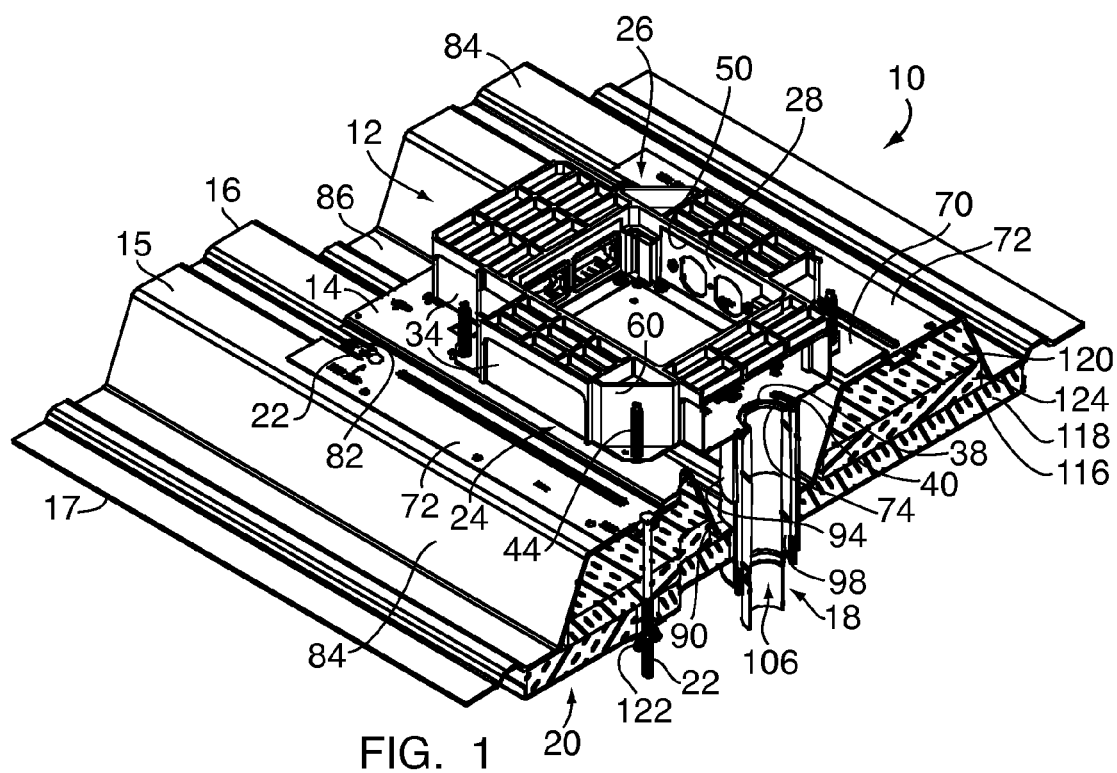
FIG. 1 is a perspective and partial sectional view of a fire classified floor box assembly installed on a floor deck prior to concrete pour.

Referring to FIG. 1, a fire classified floor box assembly 10 includes a floor box 12 and a mounting plate 14 for supporting the floor box 12 on an upper side 15 of a concrete form or floor deck 16, which also includes a lower side 17. The floor box assembly 10 also includes at least one hollow intumescent stem 18 attached to the floor box 12 and a below-floor insulation kit 20 disposed on the lower side 17 of the floor deck 16 and attached to the mounting plate 14 by a plurality of attachment fasteners 22 extending through the floor deck 16.

Figure 2:
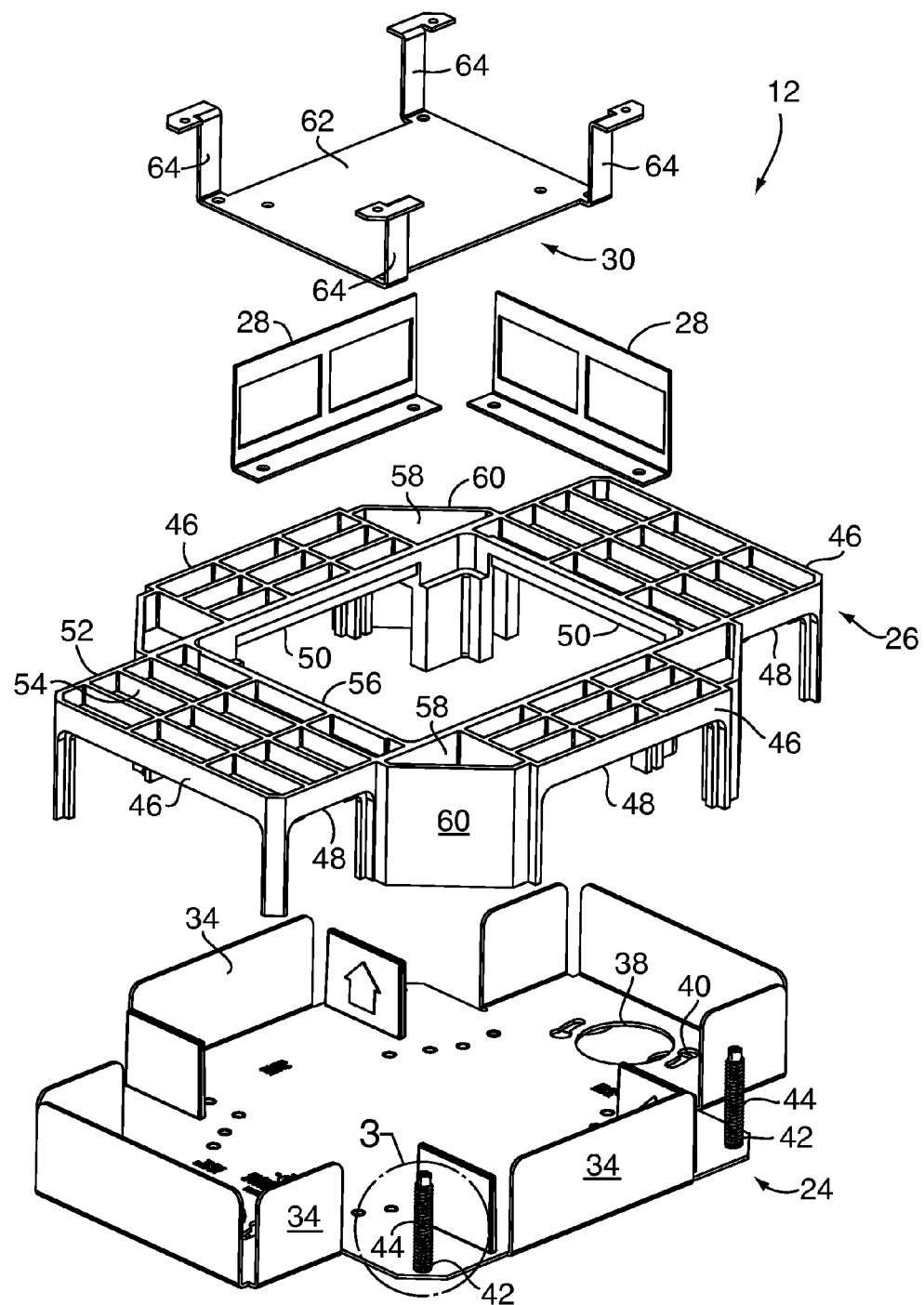
FIG. 2 is an exploded perspective view of a floor box portion of the floor box assembly shown in FIG. 1.

Referring to FIG. 2, the floor box 12 includes a lower plate 24, a cover 26, which fits onto the lower plate 24 and accommodates interchangeable outlet plates 28, and a brace 30 that fits into the cover 26 and attaches the cover 26 to the lower plate 24.

Figure 3:
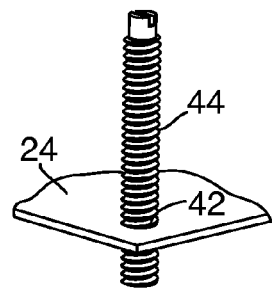
FIG. 3 is a detailed perspective view of an adjustment fitting and a lower plate of the floor box portion shown in FIG. 2.

The lower plate 24 includes side tabs 34 which are bent upward to form sides of the floor box 12, one or more wire openings 38, and mounting slots 40 formed adjacent to each wire opening 38. The lower plate 24 also includes adjustment mounts 42 for receiving adjustment fittings 44. According to one embodiment of the present invention, the adjustment mounts 42 are threaded holes and the adjustment fittings 44 are threaded fasteners, as shown in FIG. 3. When installed into the adjustment mounts 42, the adjustment fittings 44 extend below the lower plate 24, to support the floor box 12 on the mounting plate 14. However, other attachment mechanisms could be used.

The cover 26 includes a plurality of arches 46 with each of the arches 46 including a side opening 48 and an outlet opening 50. Each arch 46 also includes a roof portion 52 having pockets 54 formed therein. The plurality of arches 46 surrounds a central access 56. The cover 26 also includes corner archways 58 providing covered conduits between arches 46 adjacent to the adjustment mounts 42. Each corner archway 58 includes a closed outward side 60, so that concrete poured around the floor box will not enter under the corner archways 58. The corner archways 58 are arranged so as to permit continued access to the adjustment mounts 42 of the lower plate 24, even after installation of the cover 26 on the lower plate 24. The brace 30 includes a base 62 for attachment to the lower plate 24, and also includes corner posts 64 for attachment to the cover 26.

Figure 4:
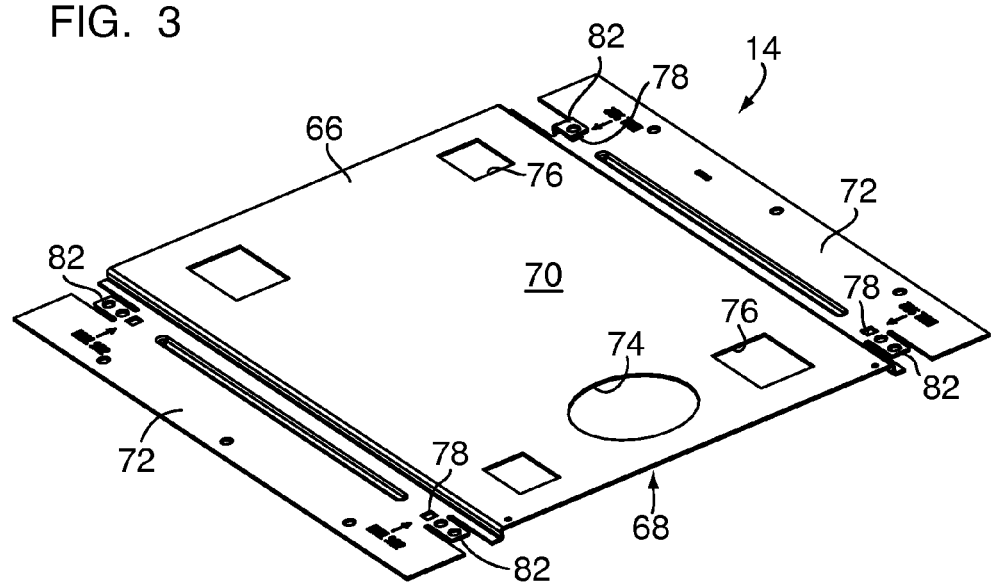
FIG. 4 is a perspective view of a mounting plate of the floor box assembly shown in FIG. 1.

Referring to FIG. 4, the mounting plate 14 includes a central platform 70 with an upper face 66 and a lower face 68, as well as outer flanges 72. The central platform 70 is offset upward from the outer flanges 72. The central platform 70 includes one or more upper stem openings 74 for insertion of at least one intumescent stem 18. The central platform 70 also includes one or more pour holes 76 formed adjacent to the outer flanges 72, outside a footprint defined by the floor box lower plate 24. The pour holes 76 can be formed integrally with the upper stem openings 74, or can be formed as separate openings through the mounting plate 14. The outer flanges 72 include an array of attachment fastener holes 78 for location and passage of attachment fasteners 22, and also include a plurality of malleable tabs 82 formed adjacent to each of the array of attachment fastener holes 78. In one embodiment, the attachment fastener holes 78 have a square outline and the attachment fasteners 22 are carriage bolts or similar corner-shouldered fasteners matching the outline of the attachment fastener holes 78. However, any type of attachment means can be used for proper attachment of the kit 20 to the mounting plate 14 and the floor 16.

Figure 5:
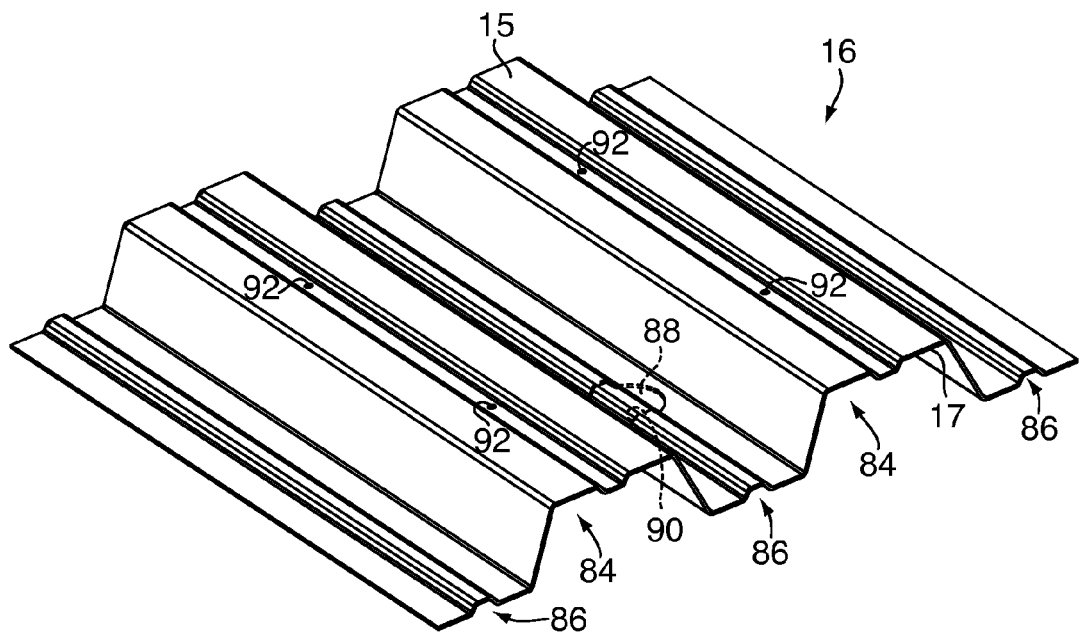
FIG. 5 is a perspective view of the floor deck shown in FIG. 1.

Referring to FIG. 5, the floor deck 16 has a corrugated cross-section with a plurality of convex flutes 84 alternating with a plurality of concave valleys 86. The floor deck 16 includes at least one punchout 88 formed in one of the valleys 86 to define one or more stem holes 90. The floor deck 16 also includes a first plurality of lower attachment openings 92 formed through the flutes 84. The lower attachment openings 92 are spaced so as to be aligned with the upper attachment openings 78 formed through the outer flanges 72 of the mounting plate 14.

Figure 7:
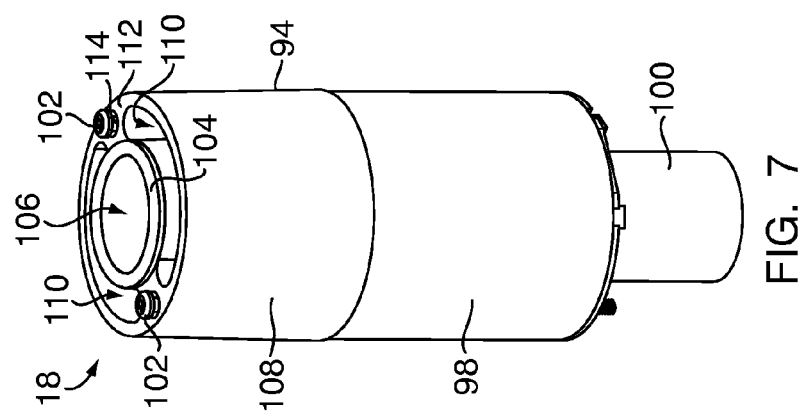
FIG. 7 is a perspective assembly view of the intumescent stem shown in FIG. 6.
Figure 6:
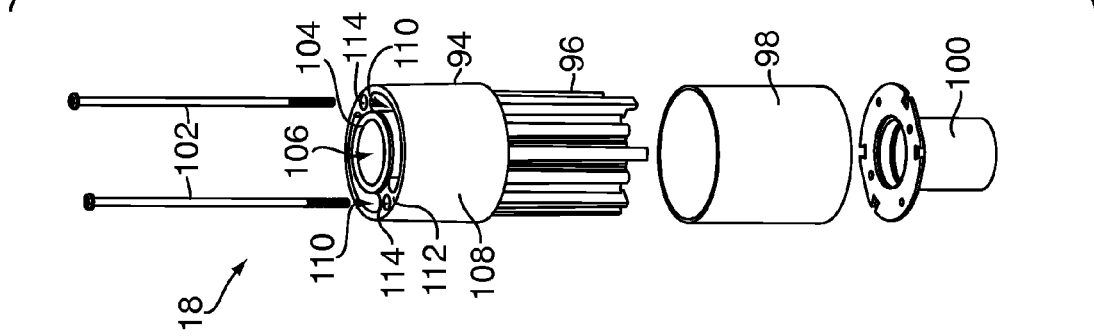
FIG. 6 is an exploded perspective view of an intumescent stem portion of the floor box assembly shown in FIG. 1.

Referring to FIGS. 6 and 7, the intumescent stem 18 includes an upper flange 94, a fluted body 96 extending from the upper flange 94, a jacket 98 fitted over the fluted body 96, a lower flange 100, and clamping fasteners 102 connecting the upper and lower flanges 94, 100. The upper flange 94 includes an inner shell 104 defining a central passage 106 for through-floor routing of wires (not shown) and an outer shell 108 defining an air gap 110 therebetween. The upper flange 94 also includes radial webs 112 bridging between the outer shell 108 and the inner shell 104. Mounting holes 114 are formed through the radial webs 112. The fluted body 96 extends downward from lower edges of the inner and outer shells 104, 106 closing off a lower end of the air gap 110. The upper flange 94 and the fluted body 96 can be fabricated from a variety of intumescent materials, including, but not limited to, for example, injection-molded sodium silicate. When exposed to flame or excessive temperatures, the intumescent material of the upper flange 94 and the fluted body 96 will char and swell so as to firmly seal the central passage 106 and the air gap 110, as well as the wire opening 38 and the stem opening 74, thereby preventing the upward spread of a fire through the floor box assembly 10. Various other suitable intumescent materials will be apparent to those of ordinary skill in the art. The jacket 98 is clamped between the upper and lower flanges 94, 100 to enclose the fluted body 96.

Figure 8:
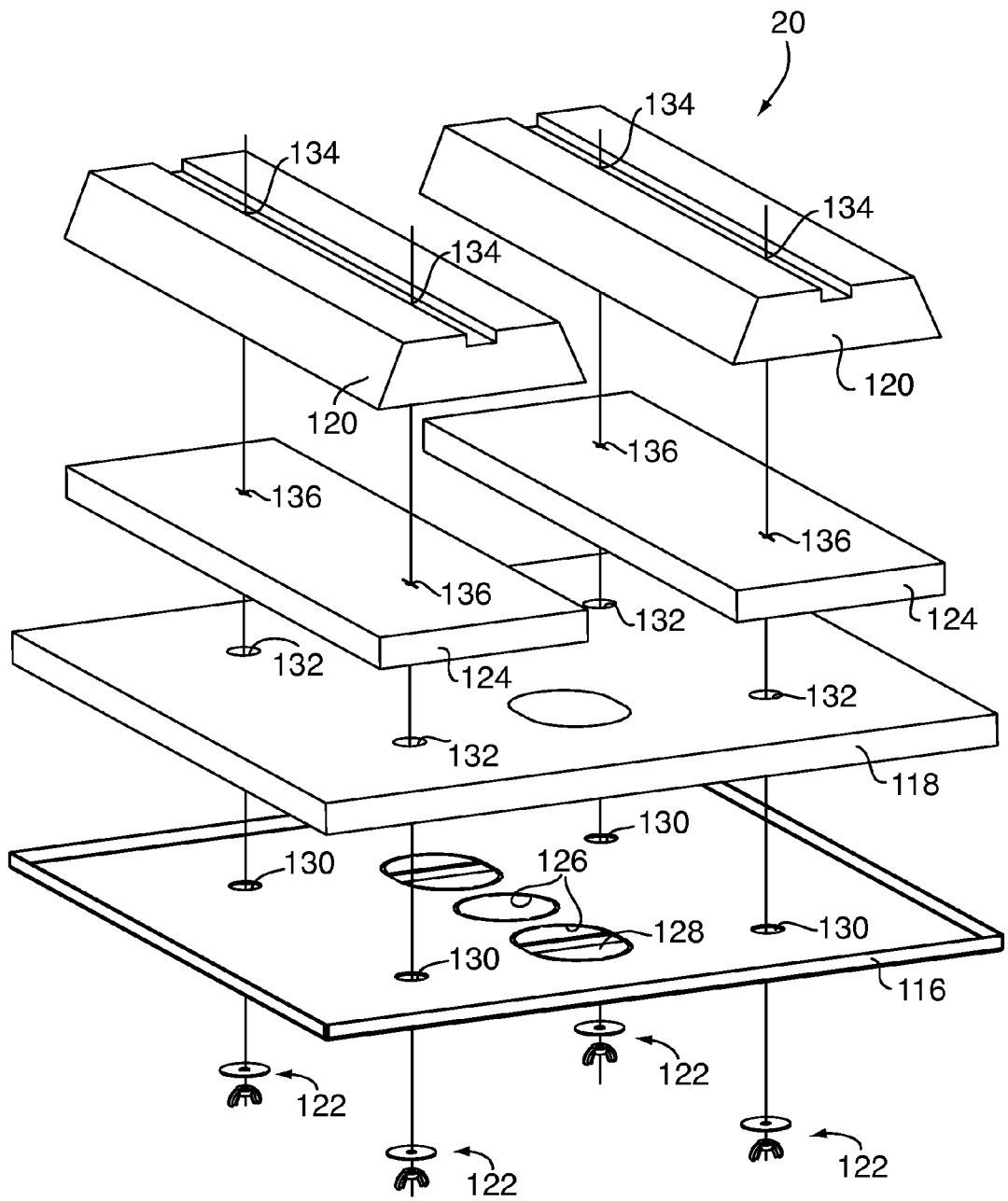
FIG. 8 is an exploded perspective view of a below-floor insulation kit portion of the floor box assembly shown in FIG. 1.
Figure 9:
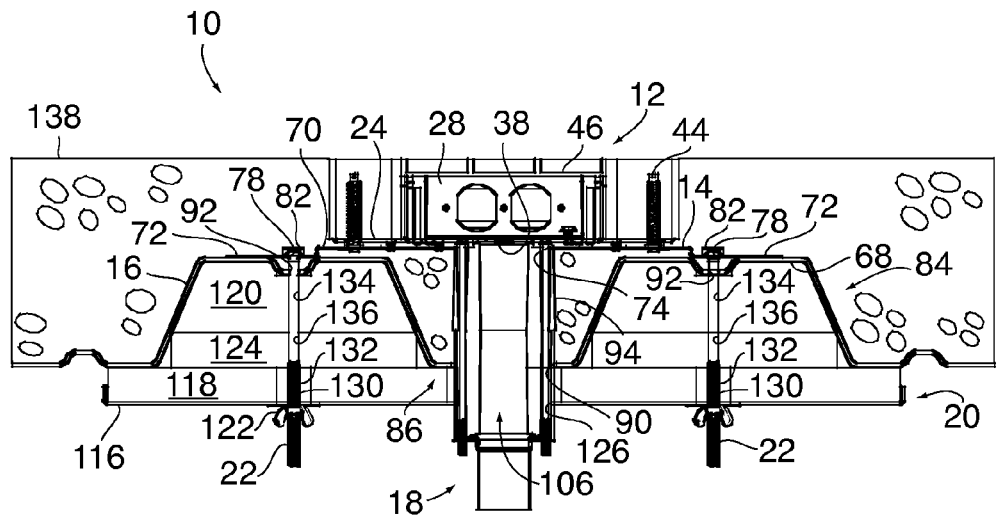
FIG. 9 is a sectional view of the fire classified floor box assembly shown in FIG. 1, as installed on a three (3) inch floor deck with an insulative spacer.
Figure 10:
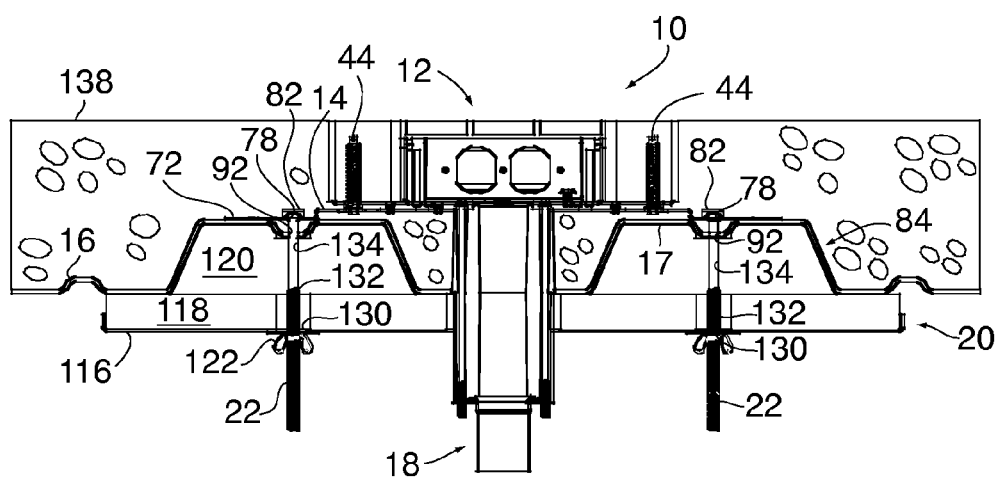
FIG. 10 is a sectional view of the fire classified floor box assembly shown in FIG. 1, as installed on a two (2) inch floor deck.

Referring to FIG. 8, the below-floor insulation kit 20 includes a tray 116, an insulation board 118 supported on the tray 116, flute closures 120 supported on the insulation board 118, and attachment fittings 122 for engaging the attachment fasteners 22, shown in FIG. 1. The insulation kit 20 also may include a variety of insulative spacers 124 interposed between the insulation board 118 and the flute closures 120 for adjusting the height of the flute closures 120 relative to the insulation board 118, as shown in FIGS. 9 and 10. The tray 116 includes one or more lower stem openings 126. Some or all of the lower stem openings 126 may be filled by punchout discs 128. The tray 116 further includes a second plurality of lower attachment openings 130 corresponding to the first plurality of lower attachment openings 92 formed through the floor deck 16. The insulation board 118, the flute closures 120, and the insulative spacer 124 include corresponding third, fourth, and fifth pluralities of lower attachment openings 132, 134 and 136, respectively. The insulation board 120 and the insulative spacers 124 may be fabricated from a variety of heat- and flame-resistant materials including intumescent foams, wall board material (such as, for example, Sheetrock®, a registered trademark to United States Gypsum Company of Chicago, Ill.), gypsum, and fiberglass. Equivalent materials will be apparent to those of skill in the art.

Figure 11:
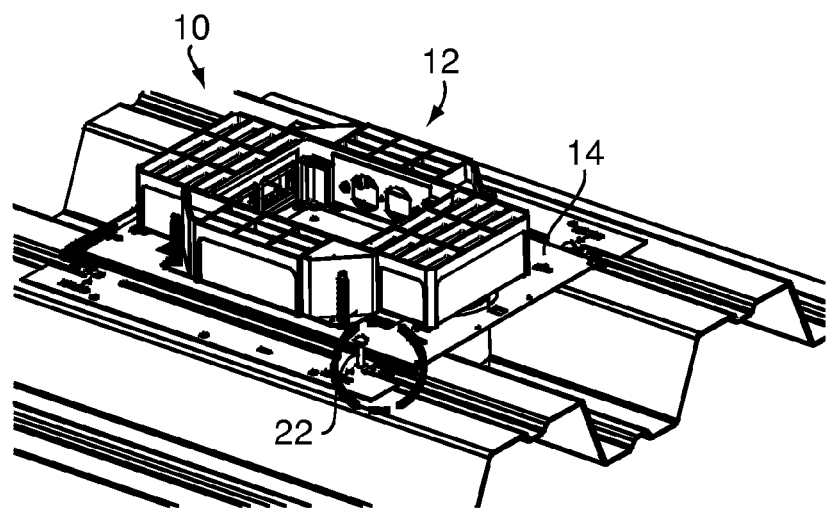
FIG. 11 is a perspective view of an attachment fastener being installed into the mounting plate shown in FIG. 4 of the floor box assembly shown in FIG. 1.
Figure 12:
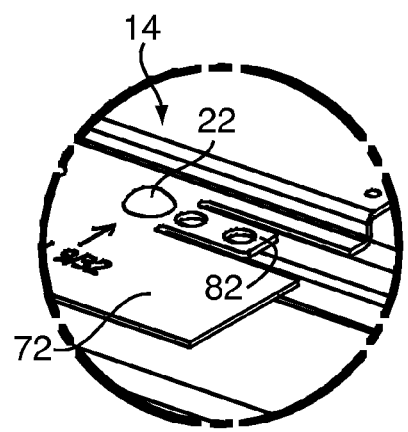
FIG. 12 is a detailed perspective view of the attachment fastener fully installed into the mounting plate shown in FIG. 11.
Figure 13:
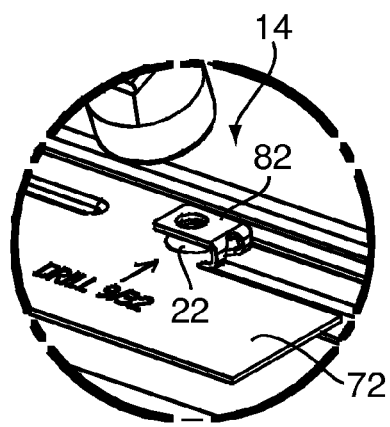
FIG. 13 is a detailed perspective view of a malleable tab bent over the attachment fastener to secure the attachment fastener into the mounting plate shown in FIG. 11.

In operation, referring back to FIG. 1, the mounting plate 14 is installed on the floor deck 16 with the outer flanges 72 resting on two or more of the flutes 84 and with the upper stem opening 74 aligned to the corresponding stem hole 90 formed in the valley 86 of the floor 16. The attachment fasteners 22 are installed through the mounting plate 14 and the floor deck 16. As shown in FIGS. 11-13, the malleable tabs 82 are folded over the attachment fasteners 22 to prevent lift-out or rotation of the attachment fasteners 22 during installation of the below-floor insulation kit 20. Referring back to FIG. 1, the intumescent stem 18 is fastened to the lower plate 24 of the floor box 12 by way of the mounting slots 40, with the central passage 106 of the intumescent stem 18 aligned to one of the wire openings 38 of the lower plate 24. The floor box 12 is installed on the mounting plate 14 so that the upper flange 94 of the intumescent stem 18 protrudes through the corresponding upper stem opening 74 of the mounting plate 14 and so that the jacket 98 of the intumescent stem 18 protrudes through the stem hole 90 formed in the valley 86. The floor box 12 is adjustably supported on the mounting plate 14 by the adjustment fittings 44, which provide for leveling and adjusting the height of the floor box 12 above the mounting plate 14 according to a desired floor thickness. The outlet plates 28 are installed into the outlet openings 50 of the cover 26. Outlets (not shown) are installed into the outlet plates 28, and wires (not shown) are routed through the central passages 106 of the one or more intumescent stems 18 and are connected to the outlets under the arches 46. The side openings 48 of the cover 26 then are fitted onto the side tabs 34 of the lower plate 24.

When concrete 138 is poured on the floor deck 16 around the floor box 12, as shown in FIGS. 9 and 10, the malleable tabs 82 maintain the attachment fasteners 22 in place. The side tabs 34, the arches 46, and the corner archways 58 maintain the concrete 138 out of the floor box 12. The pour holes 76 vent trapped air from under the central platform 70 to enhance flow of the concrete 138 into the valley 86. During concrete pour, the mounting plate 14 and the floor box 12 can be held in position on the floor deck 16 by screws, weld, or by previous attachment of the insulation kit 20. Alternatively, the mounting plate 14 and the floor box 12 can be installed into a square hole formed in an already-poured concrete floor.

Below the floor deck 16, the insulation kit 20 can be hung on the attachment fasteners 22 at any time after the attachment fasteners 22 are installed through the lower attachment openings 92 of the floor deck 16, as shown in FIGS. 9 and 10. If needed, the insulative spacers 124 can be placed on the insulation board 118 between the flute closures 120, or the insulative spacers 124 can be interposed between the insulation board 118 and the flute closures 120, as shown in FIG. 9, in order to improve the overall fit of the insulation kit 20 to the lower side 17 of the floor deck 16. Aligning the second, third, fourth, and fifth pluralities of lower attachment openings 130, 132, 134, 136 with the attachment fasteners 22 brings each lower stem opening 126 into alignment with the lower flange 100 of the corresponding intumescent stem 18, so that the insulation kit is aligned with the floor box 12 to compensate for the concrete displaced by the floor box 12. The attachment fittings 122 are fitted onto the attachment fasteners 22 to secure the tray 116 to the mounting plate 14 so that the flute closures 120 are firmly seated against undersurfaces of the flutes 84 and so that the insulation board 118 presses against the undersurface of the valley 86. Preferably, the insulation kit 20 is installed before the concrete 138 is poured so that the attachment fasteners 22 and the attachment fittings 122 can hold the mounting plate 14 firmly in position relative to the floor deck 16 while the concrete 138 is poured.

One advantage of the present invention is that the insulation kit 20 reduces radiative, conductive, and convective heat transfer from the fire through the floor box 12. In particular, the insulation board 118 blocks direct conductive or radiative heat transfer from the fire to the floor box 12 through the valley 86, while the flute closures 120 block convective heat transfer from the fire to the floor box 12 through the flutes 84. Because the below-floor insulation kit 20 can be manufactured and packaged with the floor box 12 and the mounting plate 14, the dimensions and position of the below-floor insulation kit 20 can match the dimensions and position of the floor box 12 without additional effort by a user installing the floor box assembly 10. Also, the below-floor insulation kit 20 can be clamped tightly against the floor deck 16 by way of the attachment fasteners 22 projecting through the floor deck 16. By providing below-floor insulation in optimal alignment with the floor box 12, the below-floor insulation kit 20 allows installation of a wider floor box assembly 10, with greater thermal resistance, than could be accomplished by previous through-deck fittings. The below-floor insulation kit 20 and the through-deck attachment fasteners 22 also permit providing below-floor insulation without drilling upward into a finished concrete floor, and without separately building and positioning a wallboard enclosure below the floor box assembly. Accordingly, the floor box assembly 10 provides superior fire resistance at a reduced cost in comparison to known through-floor fittings.

A further advantage is that in the event of a fire below the floor box 12, the intumescent stem 18 swells to seal the openings 38, 90, the passage 106, and the air gap 110, thus preventing passage of heat, flame, and smoke through those openings.

Another advantage of the present invention is that the attachment holes 78 formed in the mounting plate 14 position the attachment fasteners 22 in line with the lower attachment openings 92 formed in the floor deck 16, thus simplifying installation of the below-floor insulation kit 20. The malleable tabs 82 that fold over the attachment fasteners 22 prevent the attachment fasteners 22 from floating out of position during concrete pour, so that the through-deck attachment fasteners 22 can positively align the below-floor insulation kit 20 with the floor box 12. Additionally, the corners of the attachment holes 78 prevent carriage bolts, or other attachment fasteners having cornered shoulders, from spinning during installation of the attachment fittings 122 used to secure the below-floor insulation kit 20 to the floor box 12. The through-deck attachment fasteners 22 also prevent lift-out of the floor box assembly 10 after concrete pour.

Although the present invention has been shown and described with respect to the detailed embodiments thereof, it will be understood by those skilled in the art that various changes in form and detail thereof may be made without departing from the spirit and the scope of the invention. For example, the floor box 12 and/or intumescent stem 18 may have various designs and construction. Also, other means for securing may be used instead of the malleable tabs 82.

What is claimed is:

1. A floor box assembly for installation with a floor deck having alternating flutes and valleys, the floor box assembly comprising:
   a floor box adapted to be placed over the floor deck, the floor box being disposed on upper surfaces of at least two adjacent flutes of the floor deck traversing the valley between the two flutes; and
   an insulation kit for providing insulation for the floor box assembly wherein the insulation kit is disposed below the floor box on an underside of the floor deck.

2. The floor box assembly according to claim 1 further comprising:
   an intumescent stem enclosing a central passage for through-floor routing of wires to the floor box.

3. The floor box assembly according to claim 2 further comprising:
   a mounting plate including an upper stem opening for receiving the intumescent stem and a plurality of attachment fastener holes for accepting attachment fasteners for attaching the insulation kit thereto.

4. The floor box assembly according to claim 3 wherein the mounting plate includes a corresponding plurality of malleable tabs formed adjacent to the first plurality of attachment holes to insure secure attachment of the insulation kit.

5. The floor box assembly according to claim 1 wherein the insulation kit comprises:

a tray including a first plurality of attachment openings for receiving a plurality of attachment fasteners; and at least one flute closure disposed between the tray and the underside of a flute of the floor deck;

wherein the plurality of attachment fasteners attach the tray to the floor deck.

6. The floor box assembly according to claim 5 wherein the at least one flute closure includes a second plurality of attachment openings aligned with at least some of the first plurality of attachment openings for receiving at least some of the attachment fasteners.

7. An insulation kit for installation with a floor deck having alternating flutes and valleys, the insulation kit comprising:

a tray including a first plurality of attachment openings for receiving a plurality of attachment fasteners; and at least one flute closure disposed between the tray and an underside of a flute of the floor deck, the at least one flute closure being disposed within the flute;

wherein the plurality of attachment fasteners attach the tray to the floor deck to provide insulation to a floor box disposed on an upper surface of the flute.

8. The insulation kit according to claim 7 wherein the insulation kit further comprises:

an insulation board disposed between the tray and the at least one flute closure.

9. The insulation kit according to claim 7 wherein the insulation kit further comprises:

an insulative spacer disposed between the tray and the at least one flute closure.

10. The insulation kit according to claim 7 wherein the at least one flute closure fits into the flute of the floor deck on the underside thereof.

11. The insulation kit according to claim 7 wherein the insulation kit further comprises a plurality of flute closures with each flute closure fitting into one of the flutes.

12. The insulation kit according to claim 7 wherein the at least one flute closure includes a second plurality of attachment openings for receiving at least some of the attachment fasteners.

13. The insulation kit according to claim 7 wherein the tray includes a lower stem opening for receiving an intumescent stem.

14. A floor box assembly for installation with a floor deck having alternating flutes and valleys, the floor box assembly comprising:

a floor box adapted to be placed over the floor deck, the floor box being disposed on upper surfaces of at least two adjacent flutes of the floor deck traversing the valley between the two flutes, the floor box including a wire opening;

an insulation kit for providing insulation for the floor box wherein the insulation kit is disposed below the floor box on an underside of the floor deck; and an intumescent stem passing through the floor deck and insulation kit and enclosing a central passage for through-floor routing of wires to the floor box through the wire opening.

15. The floor box assembly according to claim 14 further comprising:

a plurality of attachment fasteners for securing the insulation kit to the floor box assembly.

16. The floor box assembly according to claim 1, wherein a width of the floor box is greater than a width of the valley of the floor deck.

17. The floor box assembly according to claim 14, wherein a width of the floor box is greater than a width of the valley of the floor deck.

18. A floor box assembly for installation with a floor deck having alternating flutes and valleys, the flutes being raised portions and the valleys being low portions between the flutes, the floor box assembly comprising:

a mounting plate adapted to be placed over the floor deck, the mounting plate being disposed on upper surfaces of at least two adjacent flutes of the floor deck traversing the valley between the two flutes;

a floor box adapted to be placed on the mounting plate; and an insulation kit for providing insulation for the floor box assembly wherein the insulation kit is disposed below the floor box on an underside of the floor deck.

19. An insulation kit for installation with a floor deck having alternating flutes and valleys, the flutes being raised portions and the valleys being low portions between the flutes, the insulation kit comprising:

a tray including a first plurality of attachment openings for receiving a plurality of attachment fasteners; and at least one flute closure disposed between the tray and an underside of a flute of the floor deck, the at least one flute closure being disposed within the flute;

wherein the plurality of attachment fasteners attach the tray to the floor deck to provide insulation to a floor box disposed on a mounting plate on an upper surface of the flute.

* * * * *